US006623360B1

(12) United States Patent
Nakajima

(10) Patent No.: US 6,623,360 B1
(45) Date of Patent: Sep. 23, 2003

(54) GAME SYSTEM AND INFORMATION STORAGE MEDIUM

(75) Inventor: Nobutaka Nakajima, Tokyo (JP)

(73) Assignee: Namco Ltd., Tokyo (JP)

( * ) Notice: Subject to any disclaimer, the term of this patent is extended or adjusted under 35 U.S.C. 154(b) by 0 days.

(21) Appl. No.: 09/673,173

(22) PCT Filed: Feb. 17, 2000

(86) PCT No.: PCT/JP00/00888

§ 371 (c)(1),
(2), (4) Date: Nov. 17, 2000

(30) Foreign Application Priority Data

Feb. 17, 1999 (JP) .......................................... 11-038923

(51) Int. Cl.⁷ ............................................... A63F 13/00
(52) U.S. Cl. ........................................... 463/40; 463/43
(58) Field of Search ............................... 463/1, 3, 4, 8, 463/9, 30, 31, 35, 37, 38, 39, 40–44

(56) References Cited

U.S. PATENT DOCUMENTS

| 5,848,134 | A | * | 12/1998 | Sekiguchi et al. ........ | 379/93.15 |
| 6,117,013 | A | * | 9/2000 | Eiba ............................ | 463/41 |
| 6,204,862 | B1 | * | 3/2001 | Barstow et al. ............. | 345/473 |

FOREIGN PATENT DOCUMENTS

| JP | U-2-71594 | 5/1990 |
| JP | A-5-317520 | 12/1993 |
| JP | A-6-327835 | 11/1994 |
| JP | A-8-191954 | 7/1996 |
| JP | 10-328416 | 12/1998 |
| JP | A-10-333542 | 12/1998 |
| JP | 10-333542 | * 12/1998 | ............ G09B/9/00 |

* cited by examiner

Primary Examiner—Kim Nguyen
(74) Attorney, Agent, or Firm—Oliff & Berridge, PLC

(57) ABSTRACT

The invention provides a game that is played in such a manner that game situation information of a game advanced by a game computation is transmitted to a player's portable telephone, and that game instruction information of the player is received from the portable telephone to advance the game according to the received game instruction information. The game situation information is provided to the player by a voice sound or an image through a sound output or display section of the portable telephone or a sound output or display section of a portable game machine connected to the portable telephone. If the player performs no operation with an arcade game machine prior to the passage of a given time period after the transmission of the game situation information, player's game conditions will be disadvantageously changed. If a player terminates the game, the game will be continuously advanced within a game space.

11 Claims, 17 Drawing Sheets

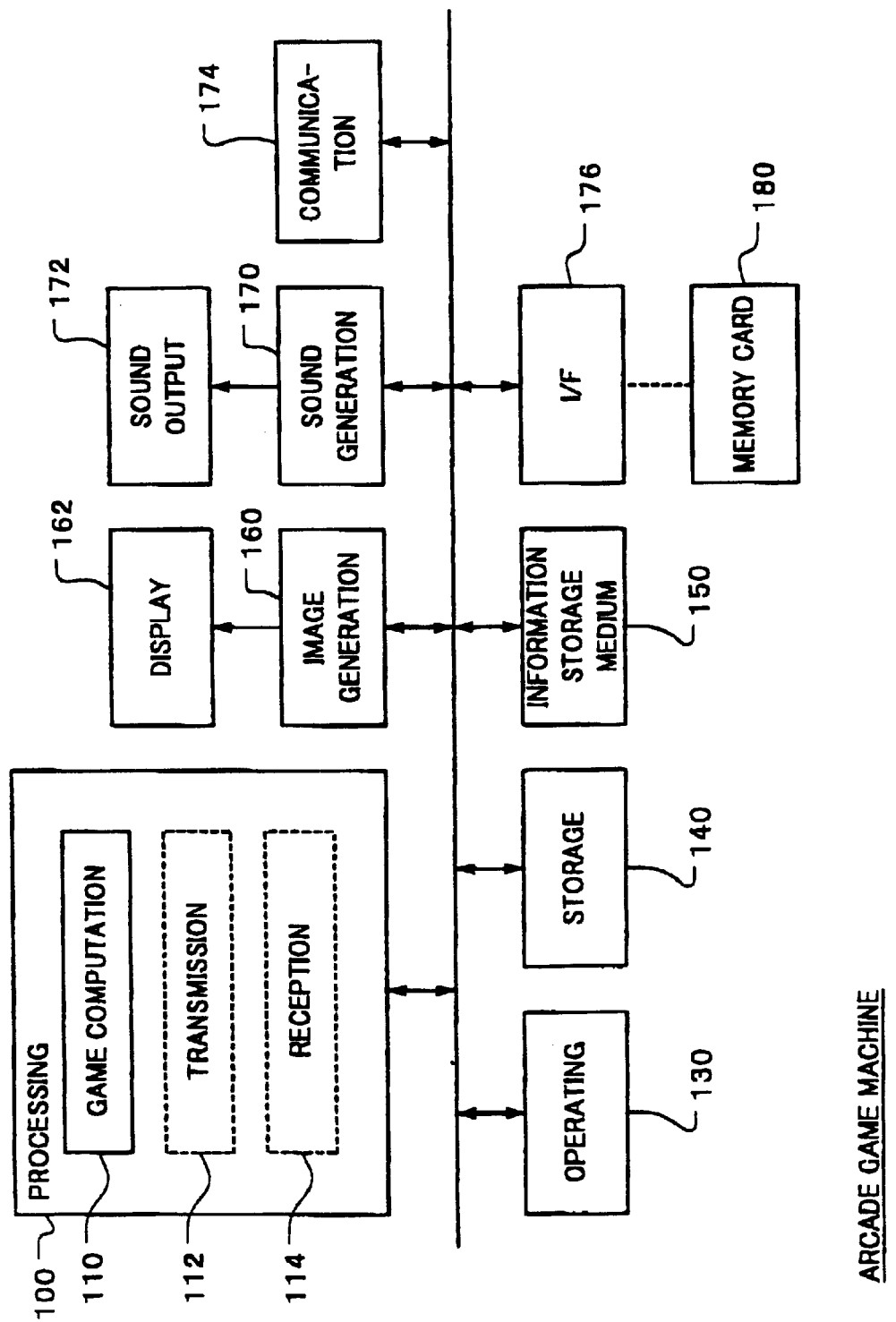

F I G. 8A
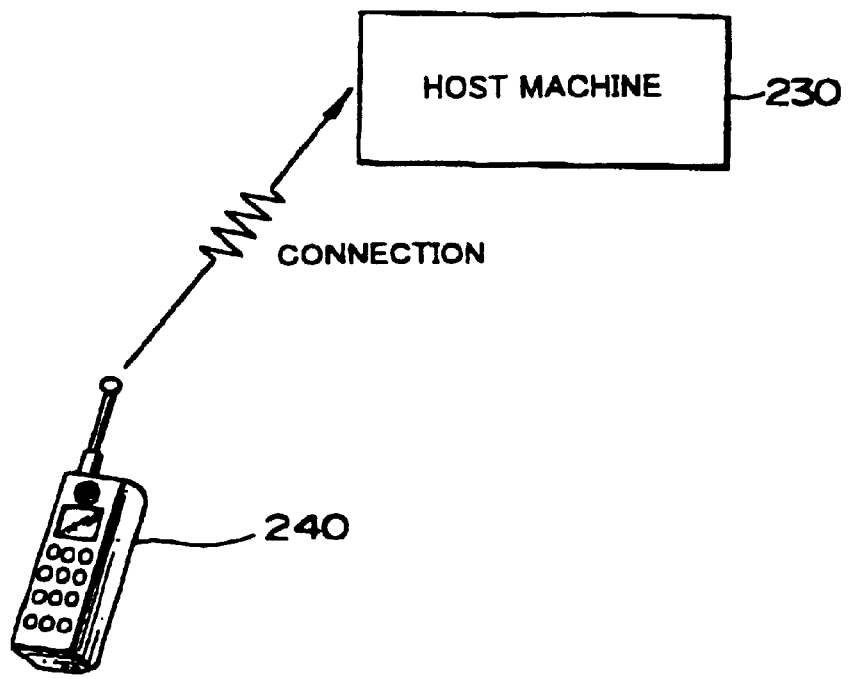
F I G. 8B
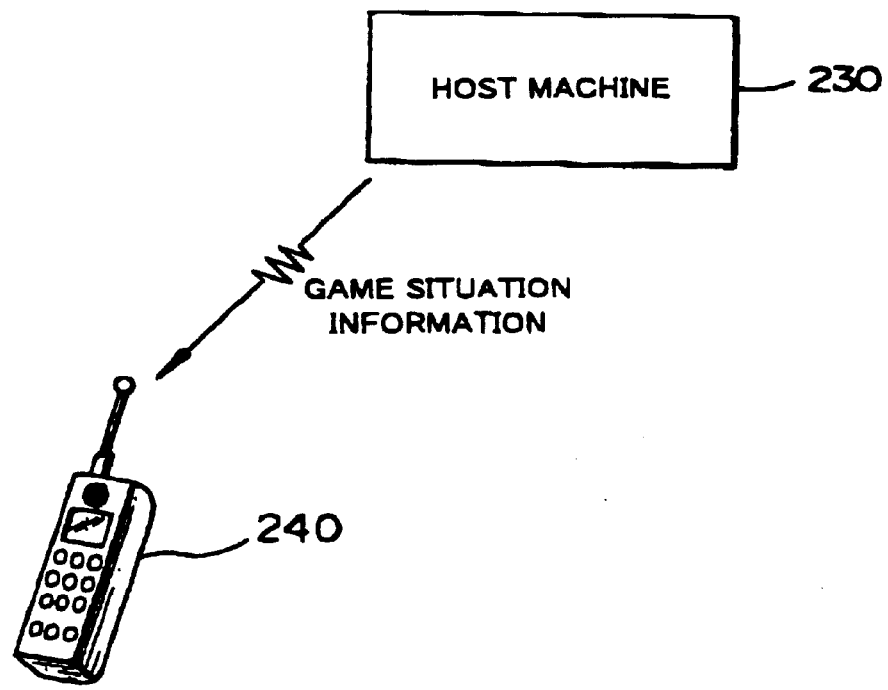

34  30  32

GAME SYSTEM AND INFORMATION STORAGE MEDIUM

TECHNICAL FIELD

The present invention relates to a game system and information storage medium.

BACKGROUND ART

There is known a game machine in which a player can enjoy a game while viewing game images. Such a game machine may be in the form of an arcade game machine installed in an amusement facility (or game center) or a domestic game machine used in a home.

The arcade game machine can use a high-performance memory or a large capacity memory. Thus, the player can enjoy a more complicated game while viewing a more finely drawn game image. On the contrary, the arcade game machine has a housing having such a size that one person cannot carry. As a result, one must go to the amusement facility to enjoy the game.

The domestic game machine is advantageous in that one can enjoy a game in a home. However, it is difficult that the domestic game machine is carried at all times, although it can be carried more easily than the arcade game machine. Thus, the domestic game machine cannot also easily be used while moving or walking, as in the arcade game machine.

Among various game machines, there is a portable game machine having such a size that it can be placed on the human palm. In such a portable game machine, however, a player is forced to continue a game play until it reaches any suitable break-point once the game is started. It is thus substantially difficult to enjoy a game in a portable game machine while doing something other than a game, such as shopping or TV viewing, walking.

On the other hand, in the management of amusement facility, there has been raised a great problem in how more persons can be attracted to the amusement facility. In recent years, however, the performance in the domestic game machine has been highly improved. The performance of the domestic game machine generating game images becomes substantially equal to that of the arcade game machine. Therefore, it increasingly becomes difficult to attract more persons to the amusement facility under such a motivation that the arcade game machine is high-powered. A more effective strategy is accordingly desired to attract more persons to the amusement facility.

DISCLOSURE OF THE INVENTION

It is therefore an objective of the present invention to provide a game system and information storage medium which enables a player to enjoy a game by utilizing his or her leisure time.

Another objective of the present invention is to provide a game system and information storage medium which give people an effective motivation to go to the amusement facility.

To this end, according to a first aspect of the present invention, there is provided a game system for a player to play a game, comprising: means for performing a game computation to advance the game according to a given game program; communication means for communicating with a portable communication terminal possessed by the player; and means for transmitting game situation information of the game advanced by the game computation to the portable communication terminal of the player through the communication means. According to a second aspect of the present invention, there is provided an information storage medium comprising information for implementing the above-described means.

According to these aspects of the present invention, the game computation is performed according to a given game program to advance the game. There is no particular limitation, but the game computation can be implemented by a high-performance processor and a large capacity memory. Thus, the player can enjoy a more complicated game.

Moreover, the game situation information of the game advanced by the game computation is transmitted to the portable communication terminal possessed by the player. As a result, the player can easily confirm the game situation at any time and in any place, even though the player does not enter the game.

In this manner, the player can always confirm (know) the situation and advance of the game through his or her portable communication terminal even though he or she is performing any matter other than the game, in addition to that the player can enjoy the complicated game. In other words, the player can easily enjoy the game in his or her leisure time.

In the game system and information storage medium of the present invention, the game situation information may be transmitted to the portable communication terminal on condition that the player makes connection between the portable communication terminal and the game system. Thus, it can be prevented that a huge communication fee is imposed on an operator of the game system.

In the game system and information storage medium according to the present invention, the game situation information may be given to the player by a voice sound which is output from at least one of a sound output section of the portable communication terminal and a sound output section of a portable game machine to which the portable communication terminal is connected. By controlling a voice sound which gives the player the game situation information, the feel of the player can be stimulated and the effect of game presentment can be improved. Particularly, the hardware resource can more effectively be utilized by using the sound output section of the portable communication terminal.

In the game system and information storage medium according to the present invention, the game situation information may be given to the player by an image displayed on at least one of a display section of the portable communication terminal and a display section of a portable game machine to which the portable communication terminal is connected. The game situation information can be transmitted to the player in more detail, in comparison with a voice sound. Particularly, if the portable communication terminal is connectable with the portable game machine, the display section of the portable game machine which can more finely display game images than that of the portable communication terminal can effectively be utilized.

When no game operation is performed by the player by using an operating means of the game system prior to the passage of a given time period after the provision of the game situation information to the player, the game system and information storage medium according to the present invention may disadvantageously change a game condition for the player. In this case, the player who does not want to be given disadvantageously changed game condition will earlier initiate the game using the operating means of the game system. This can increase the operating rate of the game system. Note that the start and end points of a given time period can be set optionally within the scope of the present invention.

The game system and information storage medium according to the present invention may further comprise means (or information for implementing means) for receiving game instruction information transmitted by the player to the game system through the portable communication terminal, wherein the game computation is performed based on the game program and received game instruction information to advance the game according to the game instruction information. This makes it possible to transmit the game instruction information corresponding to the game situation information to the game system by means of the portable communication terminal.

According to a third aspect of the present invention there is provided a game system for a player to play a game, comprising: communication means for communicating with a portable communication terminal possessed by the player; means for receiving game instruction information transmitted by the player to the game system through the portable communication terminal; and means for performing a game computation based on a given game program and the game instruction information to advance the game according to the game instruction information. According to a fourth aspect of the present invention, there is provided an information storage medium comprising information for implementing the above-described means.

According to these aspect of the present invention, the player can enjoy a complicated game, and on the other hand, the player can passively take part in a game through the portable communication terminal while the player is doing something other than the game. In other words, the player can utilize his or her leisure time to easily enjoy playing a game.

In the game system and information storage medium according to the present invention, the game instruction information which is capable of being instructed by the player may be allocated to a key or a key combination of the portable communication terminal. This makes it possible to transmit the game instruction information easily and rapidly by the portable communication terminal, and the player can more effectively utilize his or her leisure time.

In the game system and information storage medium according to the present invention, the game may continuously advanced within a game space after termination of direct game operation by the player through an operating means of the game system. This makes it possible to continuously advance the game even when the player stops the play for some reason. When the player resumes the game, it is not required to start the game from the beginning. In addition, the player can passively take part in the game by checking the game situation information or transmitting the game instruction information during suspension of the game play.

BRIEF DESCRIPTION OF THE DRAWINGS

FIG. 4 shows an example of the configuration of an arcade game machine.

FIGS. 8A and 8B are views illustrating a technique of transmitting the game situation information in response to a call from a player by a portable telephone.

BEST MODE FOR CARRYING OUT THE INVENTION

A preferred embodiment of the present invention will now be described with reference to the drawings. Although the description below concerns a robot fighting game, it should be noted that the present invention is not limited to such a robot fighting game. In addition, although the description below concerns a portable telephone (cellular phone, mobile phone) as a portable communication terminal, the portable communication terminal of the present invention is not limited to such a portable telephone, but the present invention may be applied to any other form such as PHS (personal handy-phone system), wireless communicator or the like.

1. Outline of Game System

Figure 1:
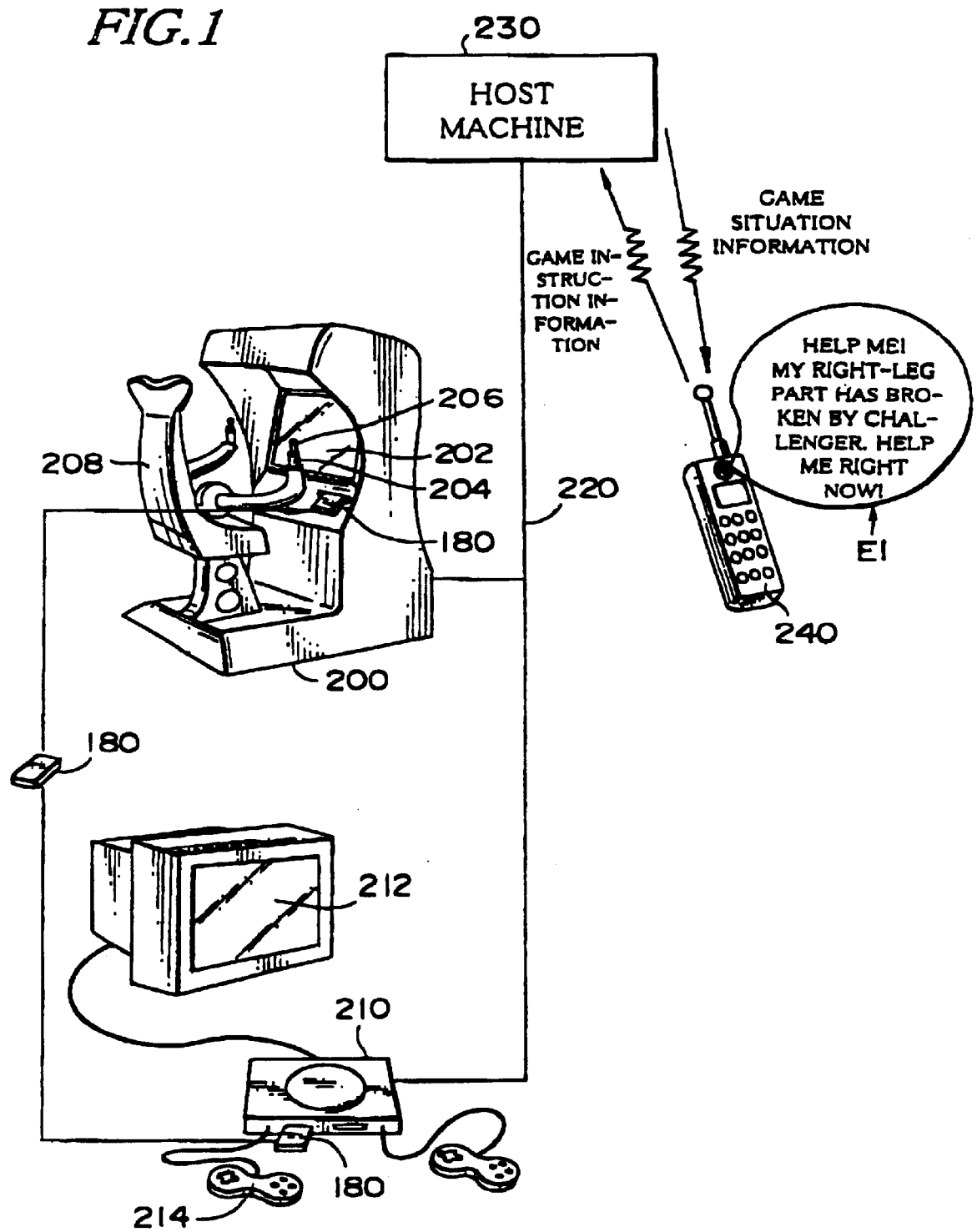
FIG. 1 is a view illustrating an example of the configuration of a game system constructed according to one embodiment of the present invention.

FIG. 1 shows a game system in which a host machine 230 is connected to an arcade game machine 200 and a domestic game machine 210 through a network 220. A plurality of arcade and/or domestic game machines may be connected to the network. In the latter case, it is particularly preferred that the connection is made through a wide area network such as internet or the like. However, the connection may take any other suitable form such as a direction connection with I/O ports or the like, or a small-scale network such as LAN (local area network) or the like. In addition, the network topology may be any of various topology types such as bus type, ring type, tree type, star type and so on. For example, if the connection is to be made according to a standard of IEEE1394 or USB, it is desirable to use the tree type topology.

In this embodiment, game situation information of a game advanced by a game computation performed on the host machine 230 (or arcade game machine 200 or domestic game machine 210), which may include situation of a character, situation of an enemy, complexion of war, situation of game advance, occurrence of an event, result of a game, a score, situation of a player's or enemy's country, remaining fuel, occurrence of emergency, degree of growing and so on), is transmitted to a player's portable telephone 240 through a telephone line or the like. Thus, the player can know the game situation through the portable telephone 240 without going to an amusement facility in which the arcade game machine 200 is placed or without returning to the player's home in which the domestic game machine 210 is placed.

According to this embodiment, the player can use the portable telephone 240 to transmit his or her instructions relating to offense, defense, evasiveness, recovery, repair, supply, strategy, scouting, report, decision making, decision of action and the like to the host machine 230 (or arcade game machine 200 or domestic game machine 210) through the telephone line or the like. These instructions will be referred to as game instruction information. The game will be computed and advanced according to the game instruction information received by the host machine 230 (or arcade game machine 200 or domestic game machine 210). Thus, the player can advance the game as he or she desires, without direct operation of the operating unit in the arcade or domestic game machine 200 or 210.

In such an arrangement as shown in FIG. 1, the processing may be divided by the host machine and game machines (or game terminals) or the host machine, game machines and a server (if the server is used). This falls in the scope of the invention. The information for realizing the process of the present invention may dispersedly be stored in the information storage mediums of the host machine and game machines (or the information storage mediums of the host device, server and game machines). This also falls in the scope of the invention. One of the game machines interconnected may function as a host machine. In addition, the connection with the network 220 may be made as necessary or at all times.

Although it is desirable that the game system includes such a host machine as shown in FIG. 1, the present invention may be applied to a game system having no host machine. In such a case, the communication of game situation information or game instruction information may be carried out between the arcade or domestic game machine and the portable telephone. In addition, the present invention may be applied to a game system not including at least one of the arcade and domestic game machines.

Figure 2:
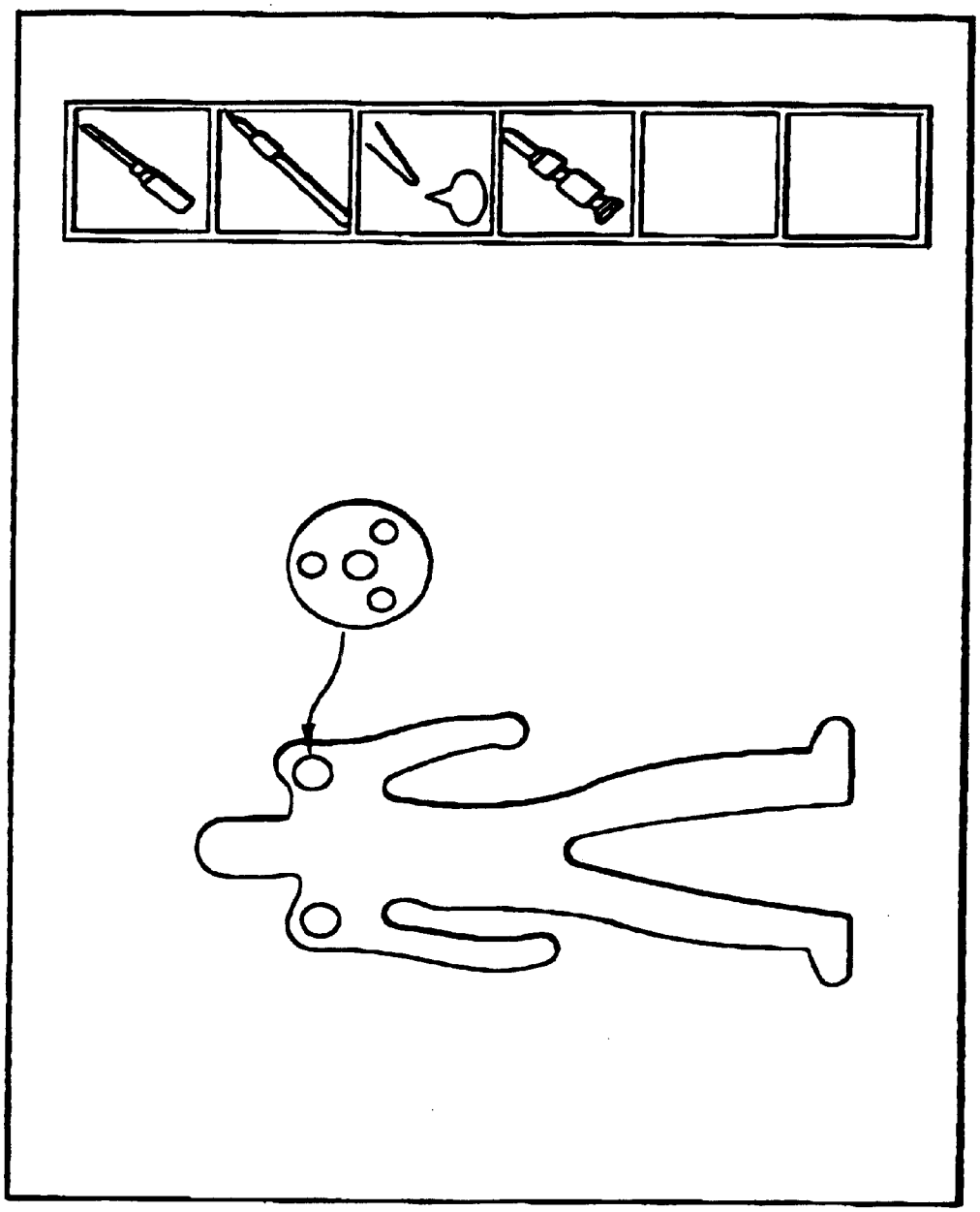
FIG. 2 is a view illustrating an example of a game image generated by a domestic game machine.

The player can use the game system according to this embodiment to enjoy the robot fighting game as follows:

First of all, the player manipulates a game controller 214 while viewing a game image displayed on a screen 212 in the domestic game machine 210, for example, such a game image as shown in FIG. 2. The player can customize a robot controlled by him or her. More particularly, the player can incorporate parts or arms which have been purchased by the player himself or herself or obtained by the previous fighting step against the other robot to his or her robot. The player may also design the appearance of a new robot to provide an original robot. The player may select or educate a virtual pilot (or virtual player) which can control the robot in place of the actual player. The player may further prepare a fighting algorithm or a thinking algorithm for a virtual pilot riding on the robot. Since such a customization for the robot requires more time, it is desirable to make the customization in the domestic game machine 210, rather than in the arcade game machine 200 which is charged according to the play time period.

As the player's robot has been customized, the information relating to the customized robot is written into a memory card (or, in a broad sense, a portable information storage device including a portable game machine or the like). Thereafter, the player will go to the amusement facility with this memory card 180. The memory card 180 is then inserted into a slot in the arcade game machine 200. As a result, the information relating to the customized robot will be read in the arcade game machine 200.

Figure 3:
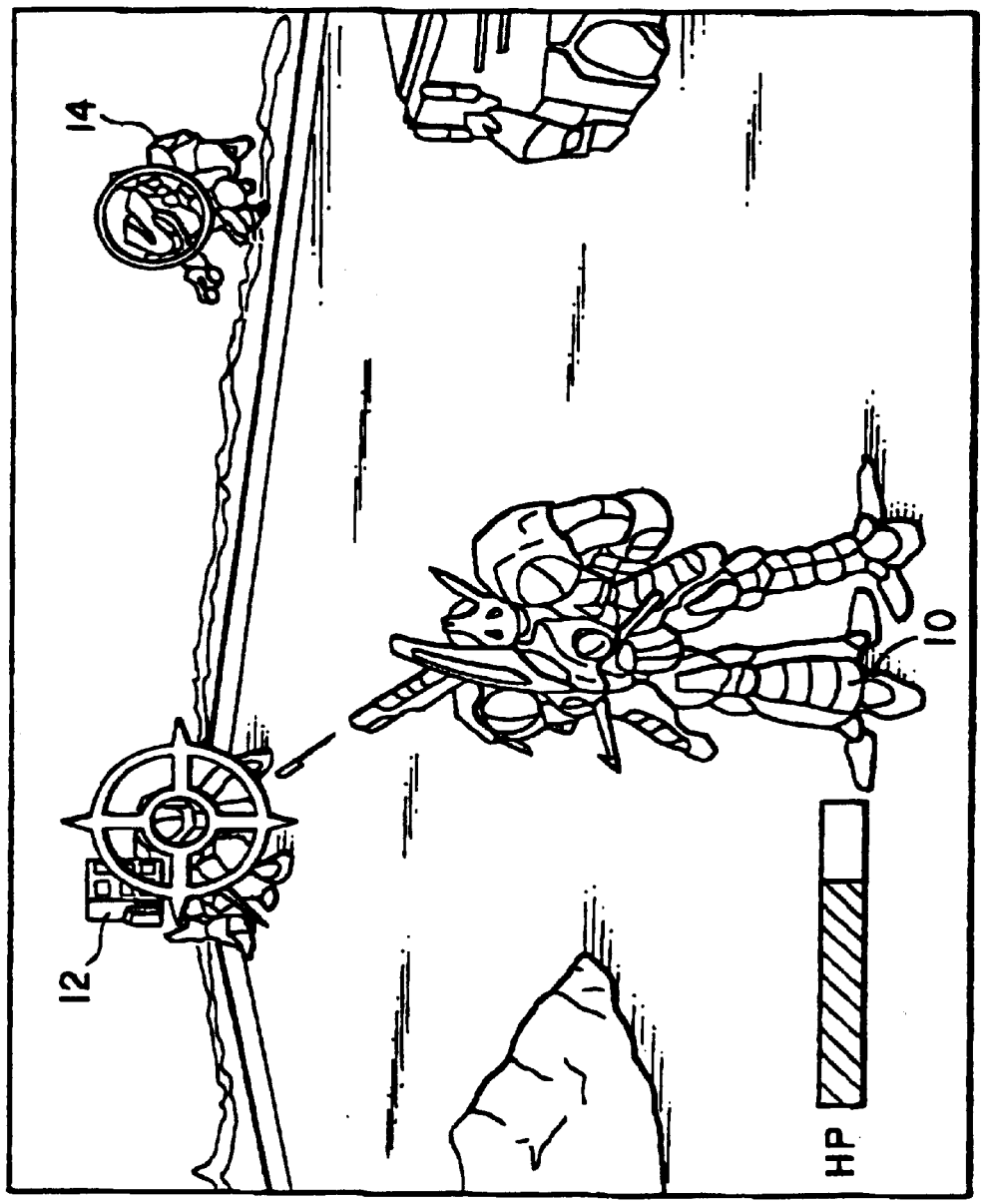
FIG. 3 is a view illustrating an example of a game image generated by an arcade game machine.

The player manipulates levers 204 and buttons 206 while viewing a game image displayed on a screen 202 in the arcade game machine 200, that is, such a game image as shown in FIG. 3. The player enjoys the fighting game between his or her robot 10 and robots 12, 14 controlled by another player and computer. In such a case, the player can compete against various players in Japan and other countries since the arcade game machine 200 is connected to the host machine 230 through the network 220. In addition, the arcade game machine 200 has a seat 208 similar to that in the actual cockpit and outputs powerful game images and sounds. Therefore, the player can obtain an improved virtual reality as he or she actually rides on and controls the robot.

When the game has terminated in the arcade game machine 200, the player determines whether or not game progress information (or information necessary for continuing the game), should be erased. The game progress information (game-in-progress information) includes robot customization information (relating to parts, arms, design, virtual pilot and fighting algorithm), result information, robot state information (relating to hit points, remaining bullets and carrying items) and the like. If the player determines to keep the game progress information, the game progress information is transmitted to the host machine 230 through the network 220 and then stored in the storage unit of the host machine 230. Alternatively, the information may be stored in the storage unit of the arcade game machine 200.

In this embodiment, the game is continuously advanced within the game space according to the game progress information stored in the storage unit of the host machine 230, even when the player has stopped playing with the arcade game machine 200 (or player's direct game operation is ended). More particularly, if the player's robot is chosen as an opponent against the robot of the other player in the game system during game play, the virtual pilot filling in for the player controls the player's robot according to the fighting algorithm prepared by the player. Thus, the player's robot fights against the robot of the other player. If the robot state information is changed due to damage, for example, the game progress information in the host machine 230 will be updated.

The player can know game situation information by using the portable telephone 240 to call the host machine 230. Alternatively, the host machine 230 may call the portable telephone 240 of the player to inform his or her of the game situation information. As shown by E1 in FIG. 1, the robot state information (or state of destruction) and the situation of battle are informed to the player using a pitiful or sorrowful voice sound (or image). The transmission of the game situation information to the player through a voice sound can impel the player to go to the amusement facility.

When the player knows the game situation information, he or she uses the portable telephone 240 to transmit game instruction information to the host machine. The instruction will slightly participate in the battle or take a temporary measure. In such a case, this embodiment can cause the player to take a desired instruction to the game only through a simplified key operation, since the contents of the instructions to the game are allocated to the respective keys on the portable telephone 240.

If such a temporary measure is insufficient, the player will go to the amusement facility wherein the player directly controls the arcade game machine 200 to enter the battle. On the contrary, if the player does not go to the amusement facility to control the arcade game machine 200 before a given time period counted from when the game situation information is transmitted to the player passes, the player's robot will be degraded in strength and defensive parameter until it disappear.

If the player's robot must be repaired, the information for the robot is written into the memory card 180 which is in turn brought to the player's home. The memory card 180 is then inserted into the slot in the domestic game machine 210. The player can repair the robot while viewing the screen 212.

According to this embodiment, the player can use the portable telephone 240 to know the game situation information without going to the amusement facility or without returning the player's house. The player can passively enter the battle by using the portable telephone 240 to transmit the game instruction information. Thus, the player can enjoy the game utilizing any available time period at any time and place. When the player knows the game situation information, the effective motivation for the player to go to the amusement facility can be provided. This can attract more persons to the amusement facility.

2. Arrangement

FIG. 4 shows a functional block diagram of an arcade game machine.

In the arcade game machine, a processing section 100 is designed to perform various proceedings such as control of the entire system, instruction to the respective blocks in the system, game computation and so on, and the functions thereof may be realized by any suitable structure of hardware such as CPU (CISC type or RISC type), DSP or ASIC (gate array or the like) or by a given program (or game program).

An operating section 130 is to input information of player's operation, with the functions thereof being realized by any suitable structure of hardware, for example, including the levers 204 and buttons 206 shown in FIG. 1.

A storage section 140 functions as a working region for the processing section 100, an image generation section 160, a sound generation section 170, a communication section 174, an I/F section 176 and so on, and the functions thereof may be realized by any suitable structure of hardware such as RAM or the like.

An information storage medium (or computer-readable storage medium) 150 is to store information including program and data, and the functions thereof may be realized by any suitable structure of hardware such as an optical disc (CD or DVD), a magneto-optical disc (MO), a magnetic disc, a hard disc, a magnetic tape, a semiconductor memory (ROM) or the like. The processing section 100 will perform various processings based on the information of program and data which has been stored in the information storage medium 150.

Part or all of the information stored in the information storage medium 150 will be transferred to the storage section 140 when the system is initially powered on.

The image generation section 160 is to generate and output various images toward a display section 162 according to instructions from the processing section 100 and the functions thereof may be realized by any suitable hardware structure such as an image generating ASIC, CPU or DSP or a given program (or image generating program) or image information.

The sound generation section 170 is to generate and output various game sounds toward a sound output section 172 according to instructions from the processing section 100 and the function thereof may be realized by any suitable hardware structure such as a sound generating ASIC, CPU or DSP, or a given program (or sound generating program) or sound information (waveform data and the like).

The communication section 174 is to perform various controls for making the communication between the game machine and any other external device (e.g., host machine or game machine) and the function thereof may be realized by any suitable hardware structure such as a communication ASIC, modem, CPU or the like or by a given program (or communication program).

The I/F section 176 functions as an interface used to perform the information interchange between the game machine and a memory card 180 according to instructions from the processing section 100 and the functions thereof may be realized by the use of a slot, a data W/R controller IC or the like. If the information interchange between the game machine and the memory card 180 is realized by the use of any suitable wireless communication (e.g., infrared communication), the functions of the I/F section 176 may be realized by any suitable hardware structure such as a semiconductor laser, an infrared sensor or the like.

The processing section 100 includes a game computation section 110.

The game computation section 110 is designed to perform various game computations for game play according to a given game program, information of operations from the operating section 130 and information from the memory card 180 and the like. More particularly, various processings executed by the game computation section 110 may include reception of coins (or, in a broad sense, charges), setting of game modes, advance of game, selection of images, determination of moving bodies (i.e., robots, missiles and so on) in position and direction, determination of visual point and line, reproduction of moving body motion, arrangement of objects in an object space, checking of hits, computation of game results (or scores), provision of a common game space for a plurality of players, processing of game over and so on.

Figure 5A:
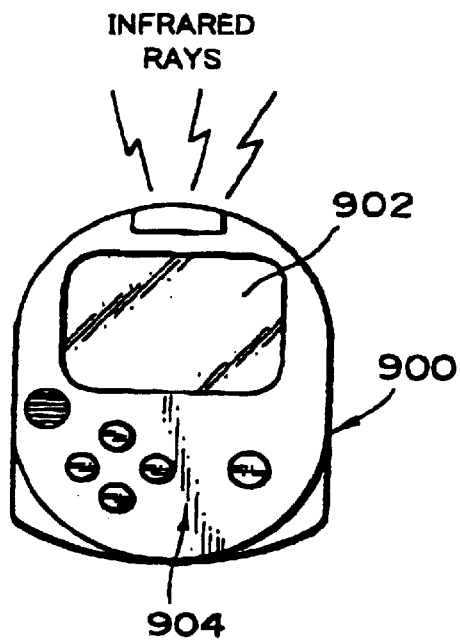
FIGS. 5A and 5B are views illustrating a portable game machine and its infrared communication.

The portable information storage device usable in this embodiment may be in the form of a portable game machine (PDA) 900 as shown in FIG. 5A, rather than the memory card. The portable game machine 900 has a display section 902 and an operating section 904 (which includes buttons or a cross-key) and can be used to enjoy a game by itself. The portable game machine 900 can be inserted into a slot in an arcade game machine and also into a slot in the machine body of a domestic game machine or in a game controller of an arcade game machine. Thus, the information interchanges between the portable game machine 900 and the arcade game machine and between the portable game machine 900 and the domestic game machine can be made so that the information interchange between the home and arcade game machines can be realized.

Figure 5B:
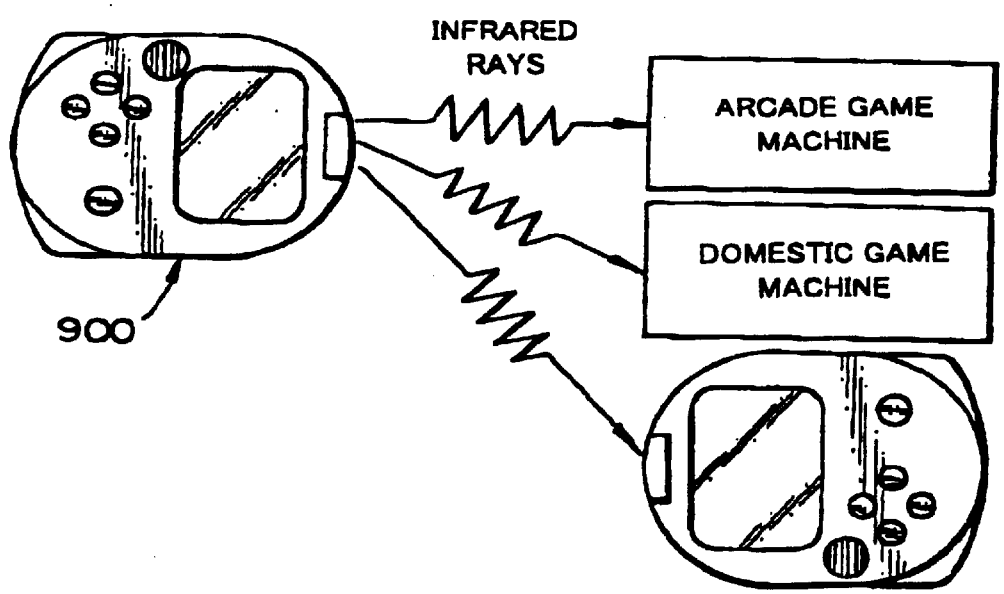

As shown in FIG. 5B, the information interchange may be carried out between the portable game machine 900 and the arcade game machine, between the portable game machine 900 and the domestic game machine or between the home and arcade game machines through wireless communication such as infrared, radio wave or other communication.

It is desirable that the information for robot is transferred between the domestic game machine and the arcade game machine or between the arcade game machines through the memory card or portable game machine. However, it may be transferred therebetween through the network.

Figure 6:
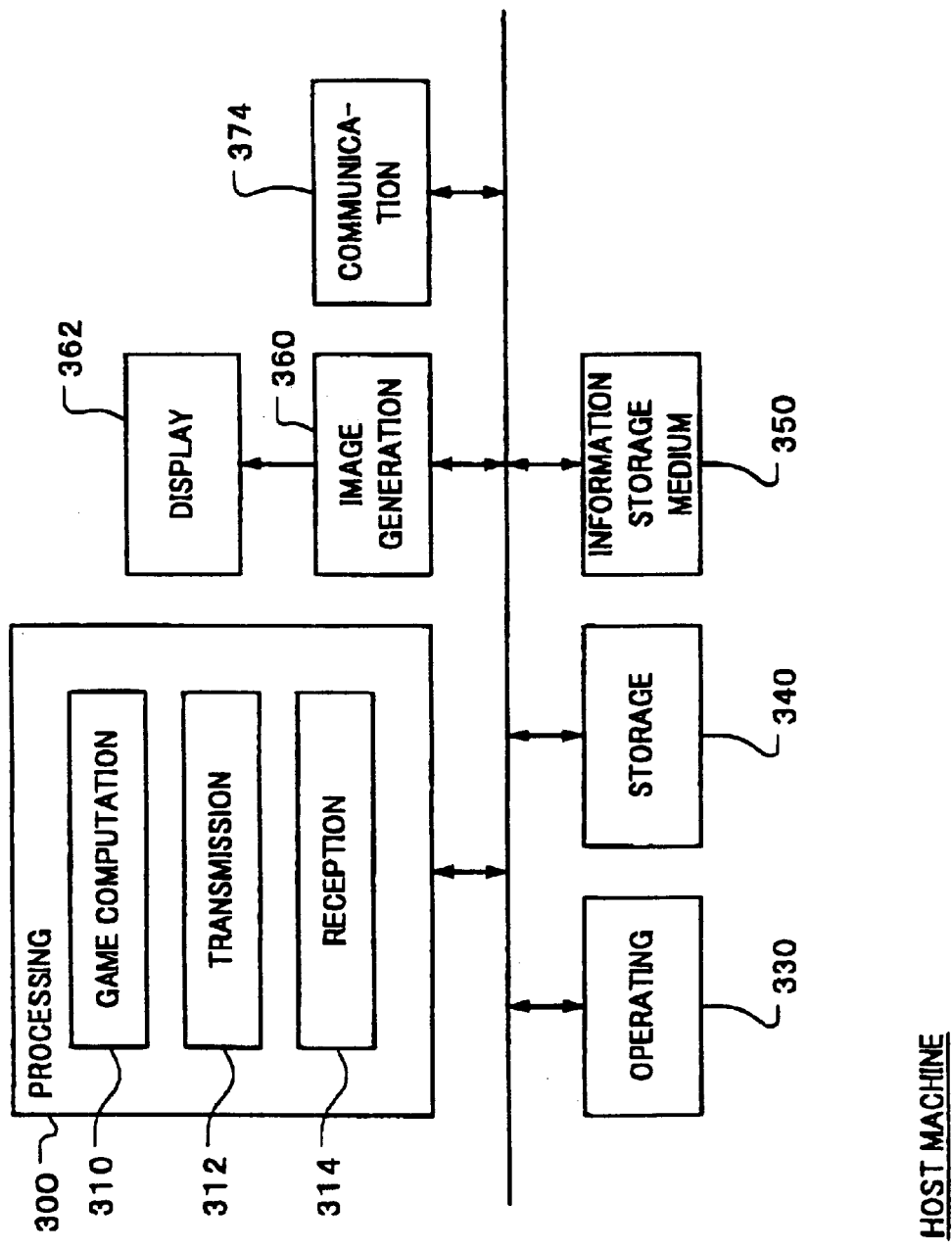
FIG. 6 is a block diagram of an example of a host machine.

FIG. 6 shows an arrangement in the host machine.

As shown in FIG. 6, the host machine comprises a processing section 300, an operating section 330, a storage section 340, an information storage medium 350, an image generation section 360, a display section 362 and a communication section 374.

The processing section 300 is to perform various processings such as control and management of the entire game system, game computation and so on and the function thereof may be realized by any suitable hardware structure such as CPU, DSP or ASIC or by a given program (or game program).

The operating section 330 is to input management information from an operator and the function thereof may be realized any suitable hardware structure such as a keyboard or the like. The operator can perform the management and drive of the entire game system by manipulating the operating section 330 while viewing an image displayed on the display section 362.

The storage section 340 provides a working region to the processing section 300, image generation section 360, communication section 374 and other sections and the functions thereof may be realized by any suitable hardware structure such as RAM or the like.

The information storage medium 350 is to store information of program and data and the functions thereof may be realized by any suitable hardware structure such as an optical disc, a magneto-optical disc, a magnetic disc, a hard disc, a magnetic tape, a semiconductor memory or the like. The processing section 300 will perform various processings based on the information of program and data that has been stored in the information storage medium 350.

The image generation section 360 is to generate and output various images toward the display section 362 according to instructions from the processing section 300 and the functions thereof may be realized by any suitable hardware structure such as an image generating ASIC, CPU or DSP or according to a given program.

The communication section 374 is to perform various processings for performing the communication between the host machine and a player's portable telephone 240 and the functions thereof may be realized by any suitable hardware structure such as a communication ASIC, modem, CPU or the like or according to a given program (or communication program). More particularly, the communication section 374 performs various processings such as reception of the call from the player's portable telephone 240, calling to the player's portable telephone 240 and others.

The processing section 300 comprises a game computation section 310, a transmission section 312 and a reception section 314.

The game computation section 310 performs various game computations for game play according to a given game program.

For example, if a player is to execute a game in the arcade game machine shown in FIG. 1, it is desirable that the distributed processing between the game computation sections 110 (see FIG. 4) of the arcade game machine 200 and the game computation section 310 of the host machine 230 is carried out to realize the game computations. More particularly, the game computation section 310 of the host machine 230 performs the processings of communicating the information of other player to the host machine, proceeding of the game, management of the entire system and so on. On the other hand, the game computation section 110 of the arcade game machine 200 performs the process of generating game images and sounds. When the game play has terminated in the arcade game machine 200, the game computation section 310 of the host machine 230 performs the process of advancing that game.

The transmission section 312 performs the process of transmitting the state information of the game advanced by the game computations to the player's portable telephone 240 through the communication section 374. More particularly, when the player instructs to transmit the game situation information through the portable telephone 240, the transmission section 312 checks game situation information which includes the battle situation information, the robot state information and so on. The game situation information is then transmitted to the player, for example, by a voice sound.

The reception section 314 is to receive game instruction information when the player instructs to transmit the game instruction information through his or her portable telephone 240. The game instruction information may be reflected to the advance of game (or game computation).

Figure 7:
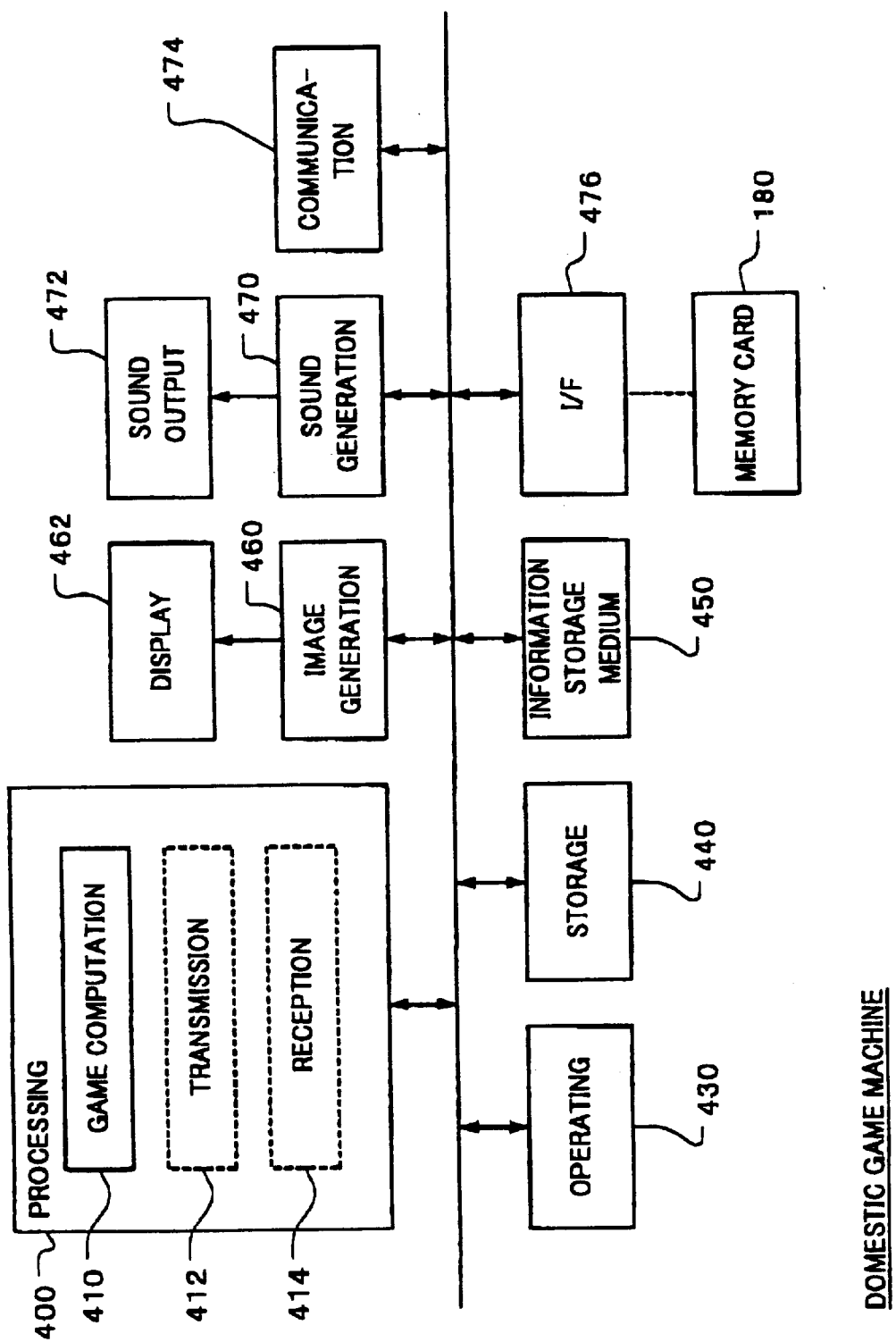
FIG. 7 is a block diagram of an example of a domestic game machine.

The transmitting and receiving processes may be distributed to the transmitting and reception sections 312, 314 of the host machine 230, the transmission sections 112, 114 of the arcade game machine 200 (FIG. 4) and the transmitting and reception sections 412, 414 of the domestic game machine 210 (FIG. 7).

FIG. 7 shows an arrangement in the domestic game machine.

As shown in FIG. 7, the domestic game machine comprises a processing section 400, an operating section 430, a storage section 440, an information storage medium 450, an image generations section 460, a display section 462, a sound generation section 470, a sound output section 472, a communication section 474 and an I/F section 476.

The processing section 400 comprises a game computation section 410 which performs various game computations according to operational information from the operating section 430, a game program and data stored in the information storage medium 450 and so on. More particularly, the processings performed by the game computation section 410 include customizing and repairing of the robot, preparing of the battle algorithm and so on. From the results of game computation, the image and sound generation sections 460, 470 generate game images and sounds which are in turn outputted through the display and sound output sections 462, 472. The player can enjoy to customize or repair the robot while viewing the game images and hearing the game sounds.

The sections in FIG. 7 have the functions substantially similar to those of FIG. 4 and realized by substantially the same hardware structures, and will not further be described.

3. Features of this embodiment

The first feature of this embodiment is to transmit the situation information of the game advanced by the game computations to the player's portable telephone 240, as described in connection with FIG. 1. Thus, the player can confirm the game situation information at any time and place.

In such a case, it is desirable that the game situation information is transmitted to the portable telephone 240 as shown in FIG. 8B on condition that (only when) the player calls the host machine 230 through his or her portable telephone 240 as shown in FIG. 8A (or, in a broad sense, on condition that the player makes connection between the portable telephone and the game system).

Unlike the techniques shown in FIGS. 8A and 8B, there may be considered a technique of automatically calling the player's portable telephone 240 from the host machine 230 to transmit the game situation information thereto. In such a technique, however, it may be possible that the operator of the game system will be charged with an unexpectedly increased telephone charge if a player wickedly teaches an incorrect telephone number to the game system operator.

On the contrary, such a situation can be avoided if the game situation information is to be transmitted on condition that the player calls (connects) the game system, as shown in FIGS. 8A and 8B.

Figure 9A:
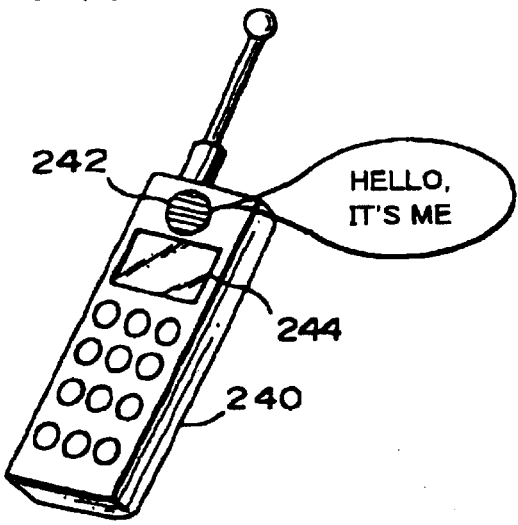
FIGS. 9A, 9B, 9C and 9D are views illustrating a technique of providing the game situation information by a voice sound or an image.

It is particularly desirable that such a voice sound as shown in FIG. 9A is transmitted to the player through the sound output section (or speaker) 242 in the portable telephone 240. Thus, the sound output section 242 normally installed in the portable telephone 240 can effectively be utilized. When the sound output section 242 is utilized, for example, a pitiful or sorrowful voice may be used to give the game situation information to the player. Thus, an effective motivation causing the player to go to the amusement facility can be provided.

If a voice sound is used to give the game situation information to the player, it is desirable that a plurality of phrases have previously been stored in the storage section. These phrases may be combined according to the game situation to generate and output a desired voice sound through the sound output section 242. Thus, a variety of game situation information pieces may be provided to the player using a memory of a relatively low capacity.

Figure 9B:
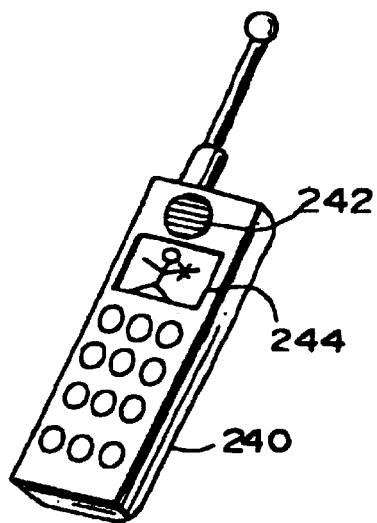

As shown in FIG. 9B, the game situation information may be given to the player through an image which is displayed on the display section (or liquid crystal panel) 244 in the portable telephone 240. In FIG. 9B, the game situation information indicating that a failure occurs in the left hand of a robot is given to the player through an image. In general, however, the display section 244 in the portable telephone 240 frequently displays only letters and icons in a simple manner. If it is wanted to give the game situation information to the player through the portable telephone 240, it is desirable that a voice sound is used as shown in FIG. 9A.

Figure 9C:
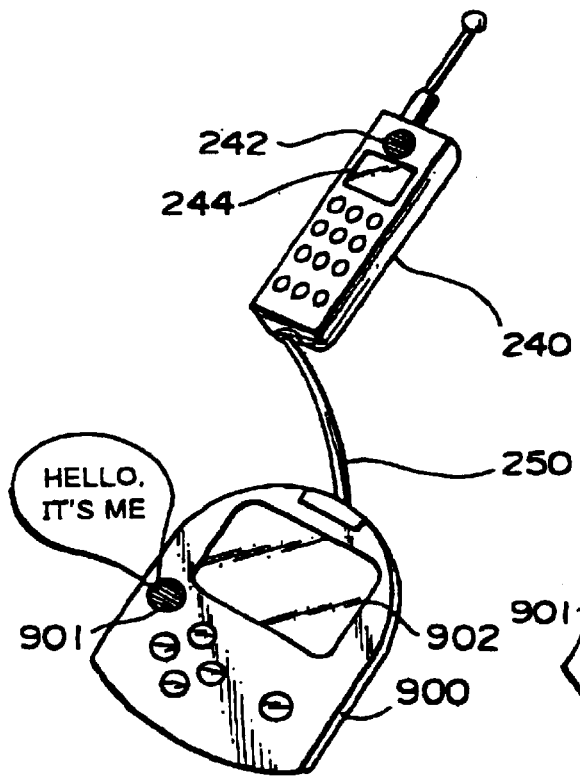
Figure 9D:
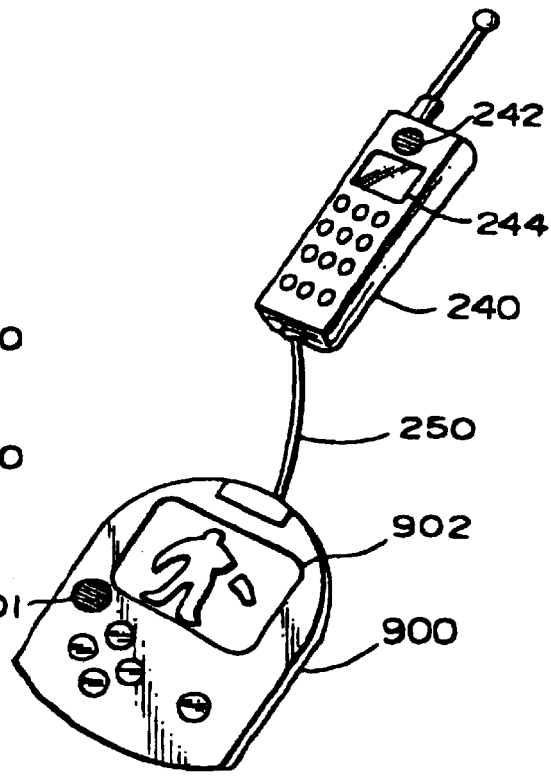

If the portable telephone 240 can be connected to the portable game machine 900 through a cable 250, a sound output section 901 in the portable game machine 900 may be used to give the game situation information to the player through a voice sound, as shown in FIG. 9C. Alternatively, a display section 902 in the portable game machine 900 may be used to give the game situation information to the player through an image, as shown in FIG. 9D. Since the display section 902 of the portable game machine 900 can display the image more finely than the display section 244 of the portable telephone 240, the game situation information can more particularly be given to the player through the display section 902 of the portable game machine 900. If the portable telephone 240 can be connected to the portable game machine 900, it is particularly desirable that the display section 902 of the portable game machine 900 is used to give the game situation information to the player through an image.

Although FIGS. 9C and 9D illustrate the portable telephone 240 connected to the portable game machine 900 through the cable 250, the portable telephone 240 may be connected directly to the portable machine 900, for example, through insertion of the portable telephone 240 into a slot in the portable game machine 900 or through wireless means.

In this embodiment, the game condition may disadvantageously be changed if the player does not operate the arcade game machine (or, in a broad sense, the game system) prior to passage of a given time period counted from the transmission of the game situation information to the player.

Figure 10A:
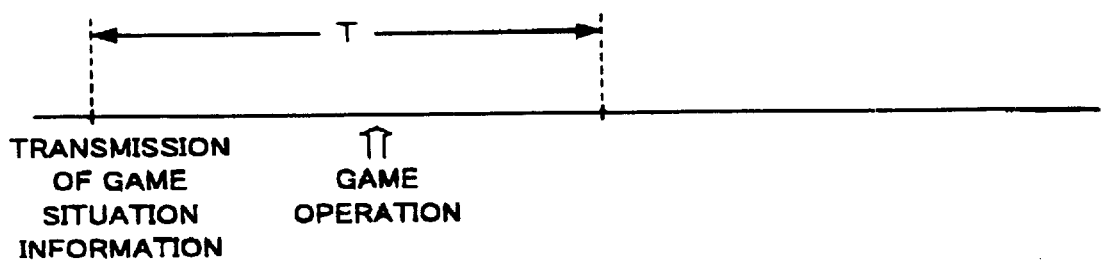
FIGS. 10A and 10B are diagrams for illustrating a technique of disadvantageously changing the game condition for a player when there is no game operation prior to the passage of a given time period after the transmission of the game situation information.

In FIG. 10A, for example, the player does the game operation using the arcade game machine in the amusement facility before a given time period T counted from the transmission of the game situation information passes. In such a case, the game condition will not be changed.

Figure 10B:
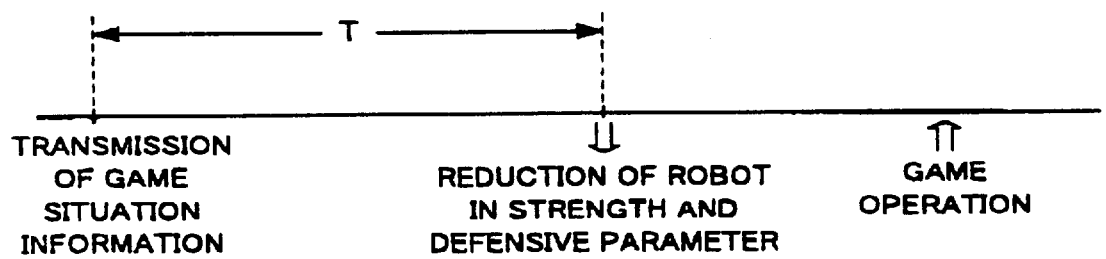

On the other hand, in FIG. 10B, the game operation is not done before the given time period T counted from the transmission of the game situation information passes. In this case, therefore, the game condition will disadvantageously be changed. More particularly, the player's robot will be reduced in strength (hot point) and offensive and defensive parameters. Finally, the player's robot will disappear.

Thus, the player will go to the amusement facility earlier before his or her robot is degraded or disappears. This can improve the administration of the amusement facility by causing more persons to go to the amusement facility.

In this embodiment, the game instruction information pieces selectable by the player are allocated to the respective keys (or combination of the keys) on the portable telephone.

Figure 11:
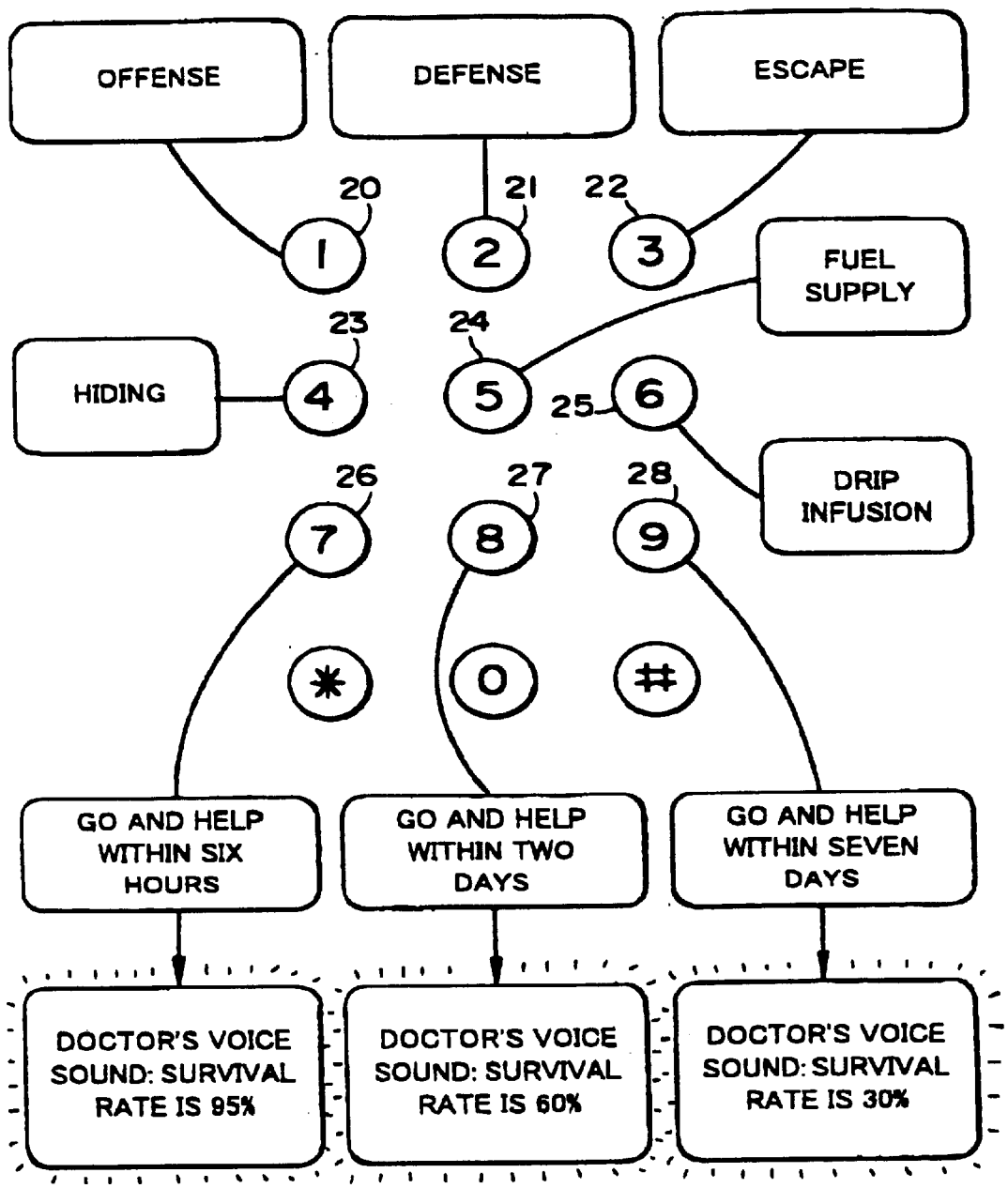
FIG. 11 is a diagram for illustrating a technique of allocating the game instruction information to each key of a portable telephone.

For example, instructions relating to "offense", "defense", "escape", "hiding", "fuel supply" and "drip infusion" may be allocated to keys 20, 21, 22, 23, 24 and 25, respectively, as shown in FIG. 11. If the player depresses the key 20, for example, the player's robot (or virtual pilot) may continue to attack the enemy. If the key 21 is depressed, the player's robot may be changed from its offensive position to its defensive position. If the key 22 or 23 is depressed, the player's robot will escape or hide from the enemy. If the key 24 or 25 is depressed, the robot will be subjected to the fuel supply or drip infusion.

If a key 26, 27 or 28 is depressed to input a time at which the player goes and helps the robot, a livability corresponding to the inputted time is transmitted to the player. When the player knows the livability of his or her robot, a more effective motivation of going to the amusement facility can be provided to the player.

If the game situation information pieces are allocated to the respective keys on the portable telephone as shown in FIG. 11, the player can transmit his or her desired game instruction to the host machine in a simple manner. According to the technique of FIG. 11, time required to input the game instruction information can be reduced. If the player does not have any available time since he or she is performing a task other than the game, the player can further effectively enjoy the game through the technique of FIG. 11. In addition, time required to perform the communication through the portable telephone can be saved.

In this embodiment, the game can be continuously advanced in the game space after termination of direct game operation by the player using the operating section of the arcade game machine (game system).

Figure 12:
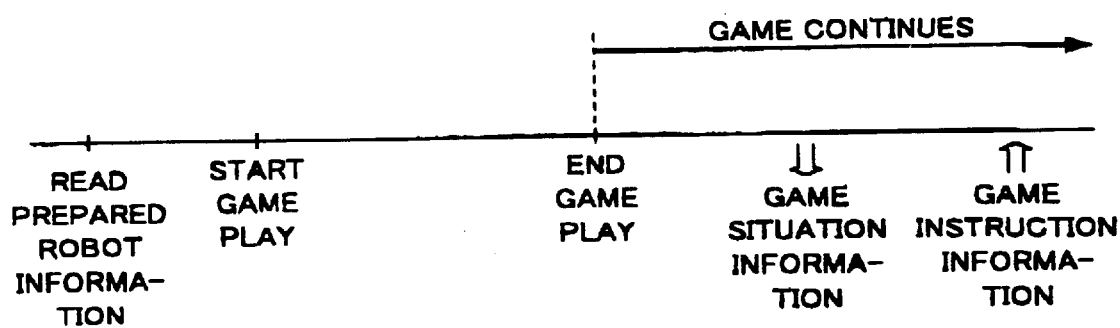
FIG. 12 is a diagram for illustrating a technique of continuously advancing a game after the termination of the player's game play.

As shown in FIG. 12, in this embodiment, the robot information prepared (created) by the domestic game machine may be read in the arcade game machine. The arcade game machine then starts the game play. Even when the game play has terminated in the arcade game machine, the game continues to be advanced, as shown in FIG. 12. In other words, even if the player terminates the game play, the virtual pilot may control the player's robot in place of the player according to the battle algorithm (or intellectual algorithm) prepared by the player so that the player's robot will continue to battle against the other robots.

In the conventional game machines, the game play is forcedly terminated when the limited time elapses (or the condition of game clear is not satisfied) after the game play has been started by inserting the coin unless a new coin is inserted in the game machine to select "Continue Play". Once the game play terminates, the game will be initialized even though a new coin is inserted into the game machine.

According to this embodiment, the player's robot can be controlled by the virtual pilot to continue the battle against the other robots, even though the player is not in direct contact with the game. In other words, the game continues even though the player terminates the game play.

However, the player can know the game situation information through the portable telephone after the player terminates the game play. In addition, the player can passively enter the battle game by transmitting the game instruction information to the host machine as necessary. In the meanwhile, the player can do any task other than the game since he or she is not required to directly manipulate the game machine. In other words, the player concerns the advance of game indirectly utilizing his or her available time.

4. Processing in the Embodiment

Detailed process in this embodiment will now be described with reference to flowcharts of FIGS. 13, 14 and 15.

Figure 13:
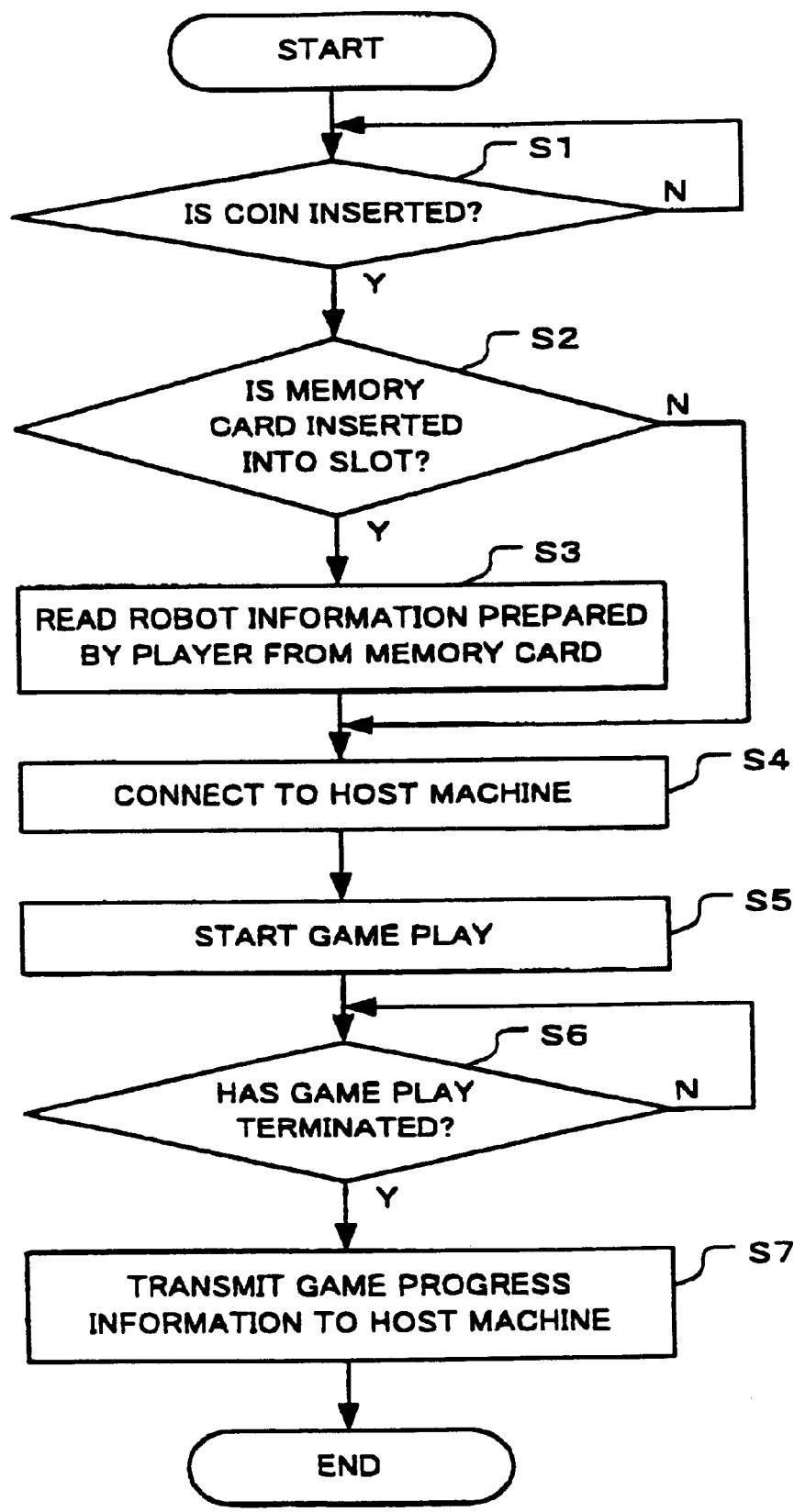
FIG. 13 is a flowchart illustrating a detailed process in an embodiment of the present invention.

FIG. 13 is a flowchart illustrating the process in the arcade game machine of FIG. 4.

First of all, it is judged whether or not a coin is inserted (or a charge is paid) by the player (step S1). If it is judged that a coin is inserted, it is then judged whether or not the memory card is inserted into a slot (step S2).

If it is judged that the memory card has been inserted, the robot information prepared by the player using his or her domestic game machine will be read out from the memory card (step S3).

Next, the arcade game machine is connected to the host machine through the network (step S4). This starts the player game play (step S5).

It is then judged whether or not the player's game play terminates (step S6). If it is judged that the player's game play has terminated, the game progress information which is necessary for advancing the game even after termination of the player's game play will be transmitted to the host machine (step S7).

Figure 14:
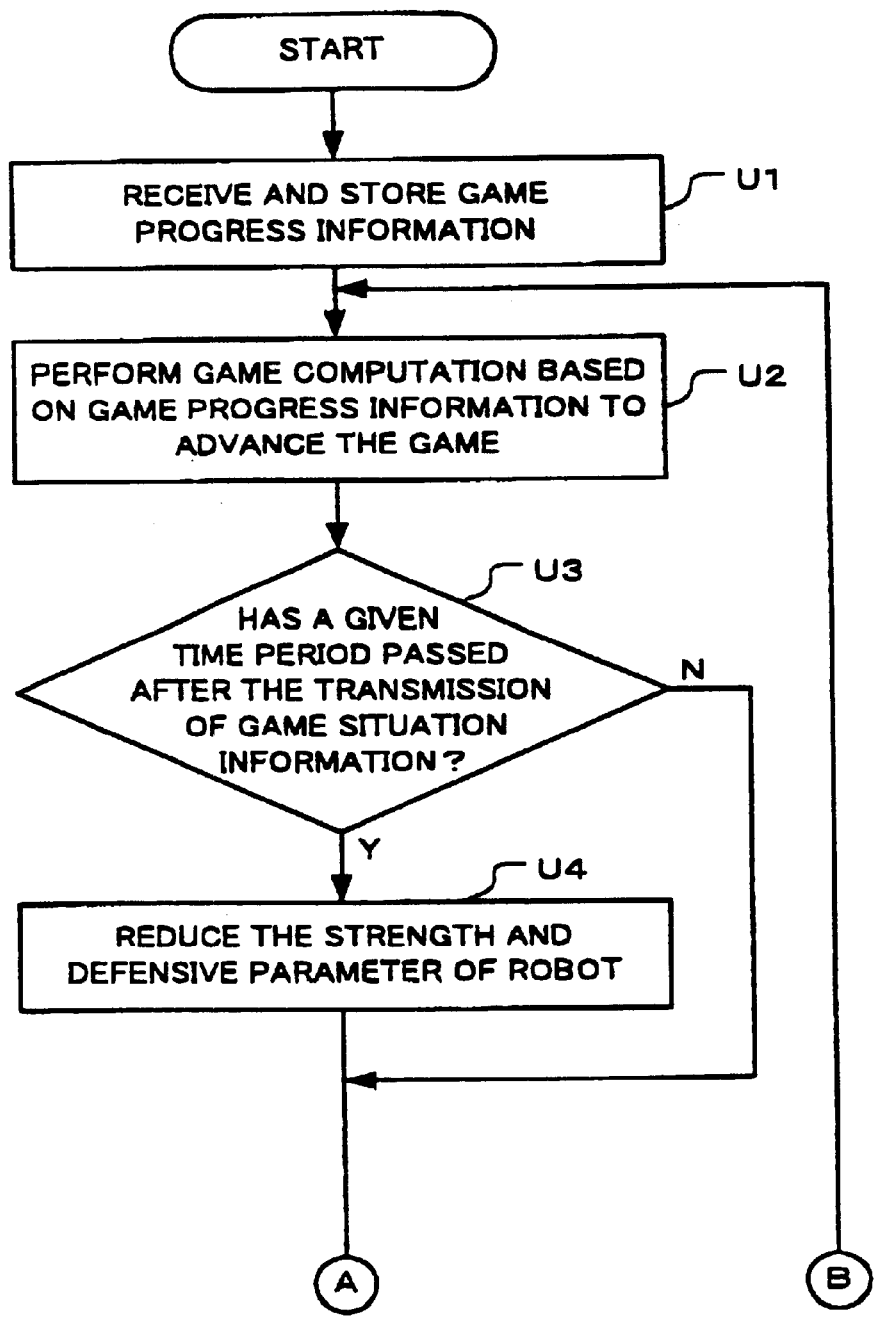
FIG. 14 is a flowchart illustrating a detailed process in another embodiment of the present invention.
Figure 15:
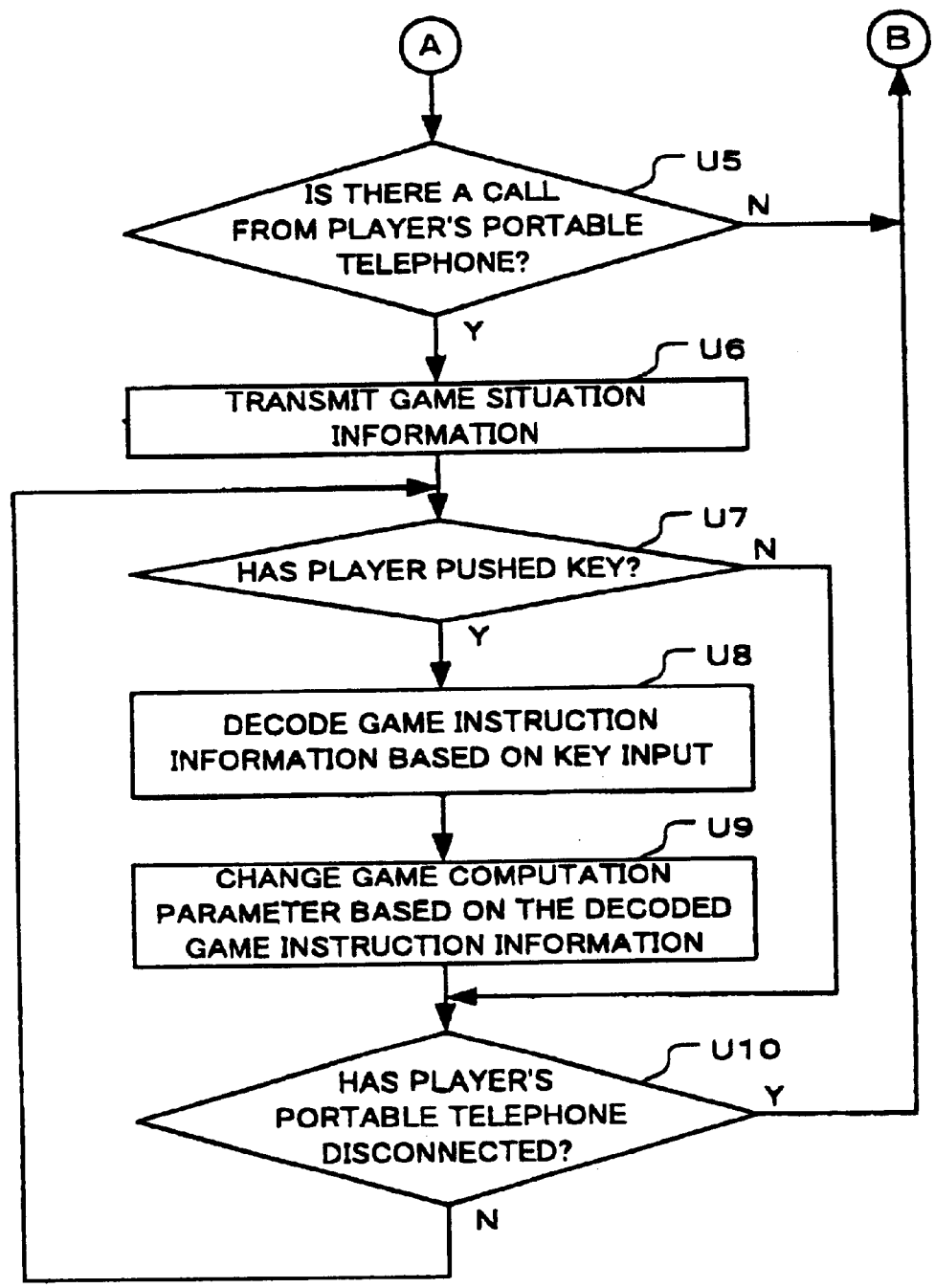
FIG. 15 is a flowchart illustrating a detailed process in a further embodiment of the present invention.

FIGS. 14 and 15 are flowcharts illustrating the process in the host machine of FIG. 6.

First of all, the host machine receives and stores the game progress information transmitted from the arcade game machine at its storage section (step U1).

The game progress information is used to perform the game computation and to advance the game (step U2).

As described in connection with FIGS. 10A and 10B, it is then judged whether or not a given time period elapses counting from the transmission of the game situation information to the player (step U3). If it is judged that the given time period has elapsed, the player's robot will be degraded in strength and defensive parameter (step U4). In other words, the player game condition will disadvantageously be changed.

It is then judged whether or not the player's portable telephone called the arcade game machine (step U5). If it is judged that the player's portable telephone called the arcade game machine, the game situation information will be transmitted to the player through the telephone line (step U6).

It is then judged whether or not the player depressed a key on the portable telephone (step U7). If it is judged that the player depressed the key on the portable telephone, the arcade game machine decodes the game instruction information from the player according to the key input (step U8).

The decoded game instruction information will be used to change parameters for the game computation (step U9). Thus, the game will be advanced according to the player game instruction information.

It is then judged whether or not the player's portable telephone is being connected to the arcade game machine (step U10). If the player's portable telephone is not in connection with the arcade game machine, the procedure returns to the step U2. If the player's portable telephone is still connected to the arcade game machine, the procedure returns to the step U7.

The present invention is not limited to the aforementioned forms, but may be carried out in any of various other forms.

For example, the game system of the present invention is desirably used in such a configuration as shown in FIG. 1, but not limited to such a configuration. The present invention may be applied to any of various other game system configurations such as a game system including no host machine, a game system including no arcade game machine, a game system including no domestic game machine and other game systems.

The contents of the game situation or game instruction information are particularly desirably used in such a configuration as described in connection with this embodiment, but may not be limited to such a configuration.

Although the present invention has been described as to the robot battle game, it may be applied to any of various games other than the robot battle game (such as growing simulation games, competition games, fighting games, shooting games, RPG games, musical games and so on).

FIGS. 16A, 16B, 17A and 17B show a plant growing simulation game to which the present invention is applied.

Figure 16A:
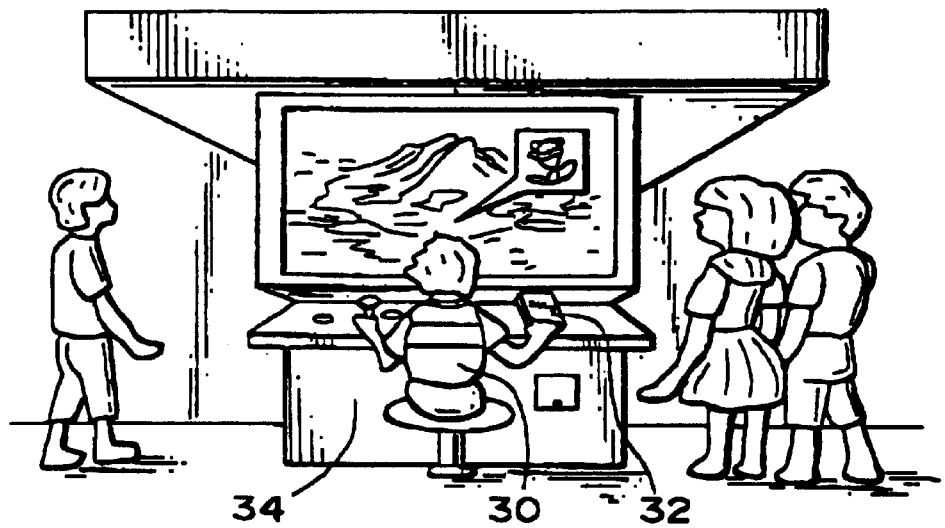
FIGS. 16A and 16B illustrate an example of a growing simulation game to which the present invention is applied.
Figure 16B:

In this growing simulation game, as shown in FIG. 16A, a player 30 first writes the information of a plant grown in the player's domestic game machine into a memory card 32 which is in turn inserted into a slot in a arcade game machine 34. The plant information is read from the memory card 32 in the arcade game machine 34 so that the plant will be planted on a virtual island within a game space. As the game play has terminated in the arcade game machine 34, the plant grows in colonies on the virtual island, as shown in FIG. 16B. The arcade game machine 34 is in connection with the host machine through a network. The management relating to the growing and colonies in the virtual island will be carried out by the host machine.

Figure 17A:
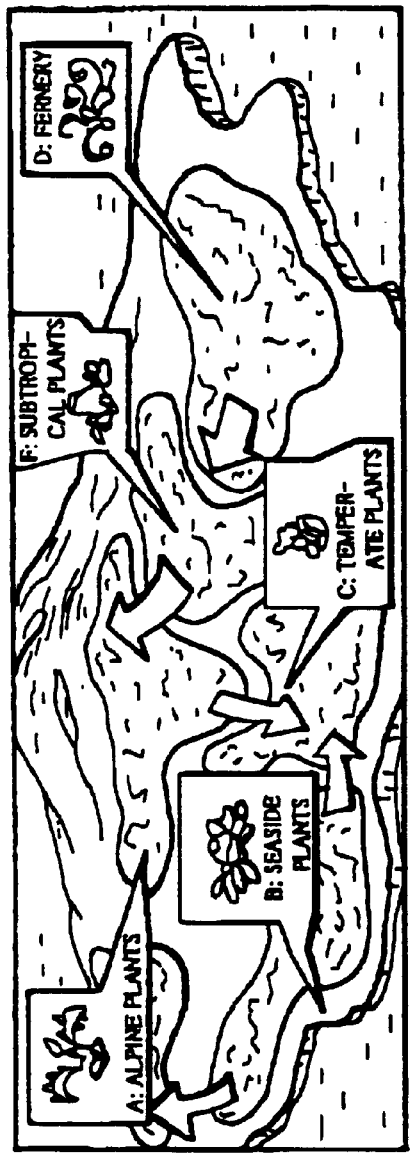
FIGS. 17A and 17B also illustrate an example of a growing simulation game to which the present invention is applied.

As shown in FIG. 17A, other plants have also been planted on the virtual island. Thus, a struggle for existence occurs between the player's plant and the other plants. If the player's plant has most grown, the player becomes a winner.

Figure 17B:
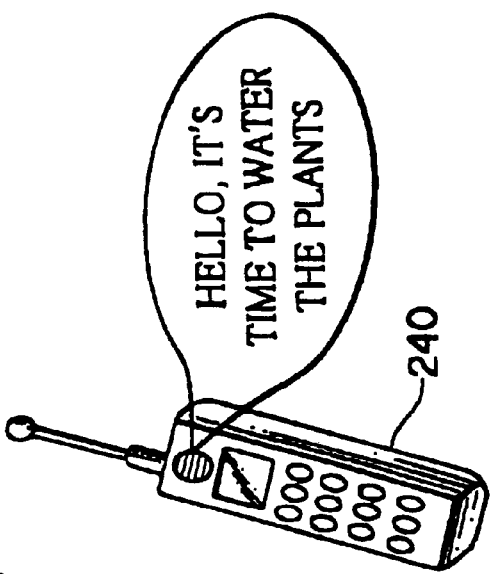

When the present invention is applied to such a growing simulation game, the game situation information will be transmitted to the player's portable telephone 240, as shown in FIG. 17B. The player can know the situation of his or her plant through the transmitted game situation information. When the player utilizes any of game instruction information pieces previously allocated to the respective keys on the portable telephone 140, the player can passively enter the game. If the player positively enters the game as by planting new seeds, the player must go to the amusement facility to manipulate the arcade game machine 34.

In such a case, the player can leave his or her character such as a plant, an animal, a monster, a robot or the like in a game space (or virtual space) which is formed by the game system. The left character can automatically act according to an action algorithm prepared by the player. Since the player can confirm the game situation information or transmit the game instruction information through his or her portable telephone even if he or she has left the character, the player can grow the character.

In recent years, a game of growing a character through a portable game machine has become popular. However, such a game must be used in a low-performance portable game machine to form a poor game space in which the character is activated. This cannot improve the interesting relating to the game.

According to the present invention, the game space in which the character is activated can be formed by the use of a high-performance game system such as host machine, arcade game machine, domestic game machine or the like. Therefore, the present invention can provide an excellent character breeding simulation game which could not be known in the art.

What is claimed is:

1. A game system for a player to play a game at an arcade game machine installed in an amusement facility, comprising:

a computation section which performs a game computation to advance the game at the arcade game machine according to a given game program;

a communication device which communicates with a portable communication terminal possessed by the player, the communication device in one of the arcade game machine or both the arcade game machine and a host machine connected to the arcade game machine through a network; and a transmitting section which transmits game situation information of the game advanced in the arcade game machine to the portable communication terminal through the communication device, wherein the game situation information is transmitted to the portable communication terminal or condition that the player makes connection between the portable communication terminal and the arcade game machine or the host machine connected to the arcade game machine.

2. The game system as defined in claim 1, wherein a game condition for the player is disadvantageously changed when no game operation is performed by the player by using an operating device of the arcade game machine prior to the passage of a given time period after the provision of the game situation information to the player.

3. The game system as defined in claim 1, further comprising:

a receiving section which receives game instruction information transmitted by the player to the arcade game machine or the host machine through the portable communication terminal, wherein the game computation is performed based on the game program and received games instruction information to advance the game at the arcade game machine according to the game instruction information.

4. The game system as defined in claim 1, wherein the game at the arcade game machine is continuously advanced within a game space after termination of direct game operation by the player through an operating device of the arcade game machine.

5. A computer-readable information storage medium which is used to a game system for a player to play a game at an arcade game machine installed in an amusement facility, comprising information for implementing:

a computation section which performs a game computation to advance the game at the arcade game machine according to a given game program;

a communication device which communicates with a portable communication terminal possessed by the player, the communication device in one of the arcade game machine or both the arcade game machine and a host machine connected to the arcade game machine through a network; and a transmitting section which transmits game situation information of the game advanced in the arcade game machine to the portable communication terminal through the communication device wherein the game situation information is transmitted to the portable communication terminal on condition that the player makes connection between the portable communication terminal and the arcade game machine or the host machine connected to the arcade game machine.

6. The information storage medium as defined in claim 5, wherein a game condition for the player is advantageously changed when no game operation is performed by the player by using an operating device of the arcade game machine prior to the passage of a given time period after the provision of the game situation information to the player.

7. The information storage medium as defined in claim 5, further comprising:

information for implementing a receiving section which receives game instruction information transmitted by the player to the arcade game machine or the host machine through the portable communication terminal, wherein the game computation is performed based on the game program and received game instruction information to advance the game at the arcade game machine according to the game instruction information.

8. The information, storage medium as defined in claim 5, wherein the game at the arcade game machine is continuously advanced within a game space after termination of direct game operation by the player through an operating device of the arcade game machine.

9. A communication method which is used for a game system for a player to play a game at an arcade game machine installed in an amusement facility, comprising:

performing a game computation to advance the game at the arcade game machine according to a given game program;

communicating with a portable communication terminal possessed by the player using the communication device in one of the arcade game machine or both the arcade game machine and a host machine connected to the arcade game machine through a network; and transmitting game situation information of the game advanced in the arcade game machine to the portable communication terminal through the communication device, wherein the game situation information is transmitted to the portable communication terminal on condition that the player makes connection between the portable communication terminal and the arcade game machine or the host machine connected to the arcade game machine.

10. The communication method as defined in claim 9, wherein a game condition for the player is disadvantageously changed when no game operation is performed by the player by using an operating device of the arcade game machine prior to the passage of a given time period after the provision of the game situation information to the player.

11. The communication method as defined in claim 9, wherein the game at the arcade game machine is continuously advanced within a game space after termination of direct game operation by the player through an operating device of the arcade game machine.

* * * * *